United States Patent [19]

Adams

[11] Patent Number: 4,863,129
[45] Date of Patent: Sep. 5, 1989

[54] SUCTION CUP HAVING AN INTEGRAL FASTENING DEVICE

[75] Inventor: William E. Adams, Butler County, Pa.

[73] Assignee: Adams Mfg., Portersville, Pa.

[21] Appl. No.: 161,015

[22] Filed: Feb. 12, 1988

[51] Int. Cl.[4] .............................................. F16B 7/28
[52] U.S. Cl. ................................. 248/206.2; 248/74.3
[58] Field of Search ............... 248/206.2, 205.5, 206.1, 248/74.3, 362, 205.6, 205.7, 206.1, 206.3, 359 A, 363; 24/16 PB, 17 AP, 206 A, 483, 484

[56] References Cited

U.S. PATENT DOCUMENTS

| | | | |
|---|---|---|---|
| 1,267,270 | 5/1918 | Rheinlander | 248/205.5 X |
| 1,859,893 | 5/1932 | Ritz-Woller | |
| 2,502,714 | 4/1950 | Garnett | 248/206.3 X |
| 2,531,888 | 11/1950 | Nye et al. | |
| 3,050,578 | 8/1962 | Huebner | 248/74.3 X |
| 3,331,904 | 7/1967 | Friedman | 264/108 |
| 3,463,427 | 8/1969 | Fisher | 248/74.3 X |
| 4,149,298 | 4/1979 | Forest | 248/74.3 X |
| 4,240,183 | 12/1980 | Sumimoto | 24/16 PB |
| 4,540,534 | 10/1985 | Grendol | 264/2.2 |
| 4,570,368 | 2/1986 | Stover | 24/16 PB X |
| 4,711,002 | 12/1987 | Kreeger | 24/17 AP X |

FOREIGN PATENT DOCUMENTS

| | | | |
|---|---|---|---|
| 209245 | 5/1960 | Austria | 248/74.3 |
| 1052285 | 12/1966 | United Kingdom | 248/74.3 |

Primary Examiner—J. Franklin Foss
Attorney, Agent, or Firm—Buchanan Ingersoll; Lynn J. Alstadt

[57] ABSTRACT

A suction cup and integral fastening device for hanging ornaments or other decorative objects is disclosed. A tether extends outward from a neck portion of the suction cup. Stopping members and protuberances of various shapes and sizes on the tether permit the tether to be inserted into a suitable opening in the neck member and prevent it from being removed. Alternatively, a ribbed rivet can be provided on the unattached end of the tether. This rivet can be inserted into a ribbed bore provided in the neck member. The ribbed surfaces interact to securely fasten the unattached end of the tether to the suction cup.

17 Claims, 2 Drawing Sheets

SUCTION CUP HAVING AN INTEGRAL FASTENING DEVICE

BACKGROUND OF THE INVENTION

1. Field of the Invention

The present invention relates to the field of suction cups and more particularly to the field of suction cups having a fastening device formed integrally therewith.

2. Background of the Invention

It is well known in the art to attach hooks or other fastening devices on a suction cup in order to form a two-piece hanger for decorative objects. An example of such a device is disclosed in my application, Ser. No. 54,816, filed on May 28, 1987. Because the fastening device is separate from the suction cup, the suction cup, by itself, is unable to hang an object. Consequently, the utility of the suction cup as a fastener becomes dependent on the availability of the fastening devices. Furthermore, because the fastening devices are separate pieces apart from the suction cup, they are easily lost or misplaced.

A problem which is frequently encountered when using a two-piece suction cup and fastening device to hang an object is the failure of the fastening device to securely hold that object. Because these fastening devices are generally open-ended hooks, an object may become displaced if either the suction cup, fastening device or object is jarred with sufficient force to permit the object to slide past the open end of the hook.

Accordingly, there is a need for a suction cup which has a fastening device which is integrally attached thereto. This fastening device should be designed that the object being hung will not fall when the suction cup or object is jarred.

SUMMARY OF THE INVENTION

In accordance with the present invention, there is provided a suction cup having a fastening device integrally attached thereto. A neck member is provided on the suction cup from which a tether extends. The neck member and tether are designed so that the tether can be filled into the neck member and thereby be securely locked in a fixed looped position. The tether is passed through the hook or other fastener of an ornament or other object and then locked in position at the neck member of the suction cup. This will securely hold the ornament to the suction cup.

There are several methods in which the end of the tether can be attached to the suction cup neck. In one method, the tether is provided with a series of stooping members or protuberances. The stopping members are arranged such that they permit the insertion of the tether into an opening in the neck member of the suction cup, but they prevent the extraction of the tether from the opening. This method of attachment permanently locks an ornament onto the suction cup.

In another method, the tether is provided with a ribbed rivet-shaped fastener. This fastener can be inserted into a bore provided in the top of the neck member on the suction cup. The inner surface of the bore is ribbed to receive and secure in place the ribbed rivet. Preferably, the bore is angled with respect to the suction cup and the rivet is similarly angled with respect to the tether. When the suction cup is attached to a vertical surface, the bore should be angled downward approximately 10° with respect to the horizontal. This downward angle further secures the ribbed rivet within the bore. This method of attachment does not permanently lock an object onto the suction cup. Rather the tether can be released and the object can be removed as desired.

DESCRIPTION OF THE PREFERRED EMBODIMENT

Figure 1:
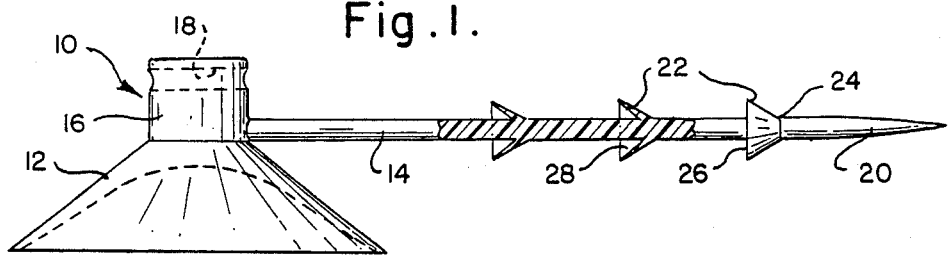
FIG. 1 is a side elevational view of a present preferred embodiment of the suction cup and fastener of my invention.
Figure 2:
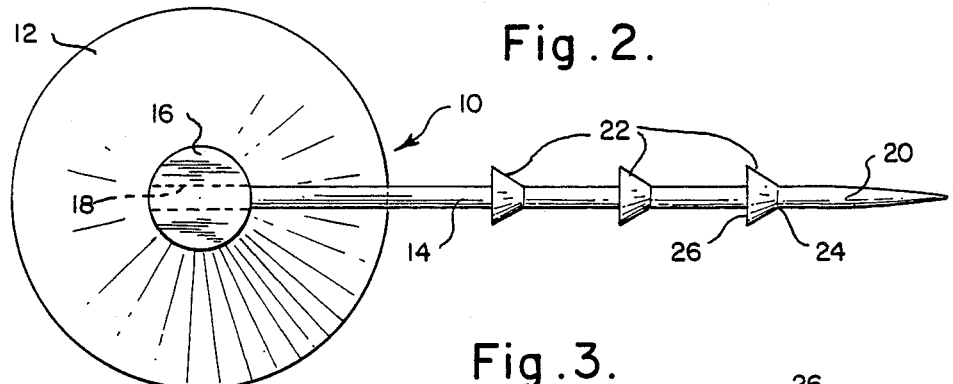
FIG. 2 is a top plan view of the suction cup and fastener of FIG. 1.
Figure 3:
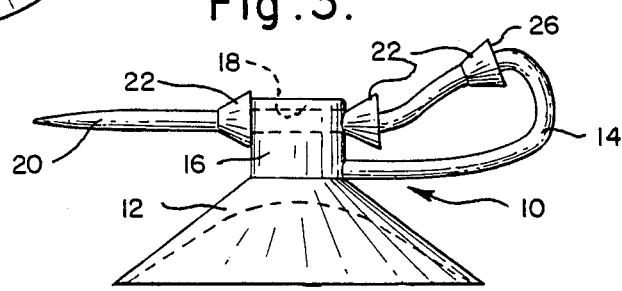
FIG. 3 is a side elevational view of the suction cup and fastener of FIG. 1 showing the method of attachment.

As shown in FIGS. 1 through 3, suction cup and fastener 10 is composed of suction cup 12 having a neck member 16 and a tether 14 integrally attached thereto. Tether 14 is sized to pass through hooks or other fasteners on an ornament or other object to be held. A bore 18, which is provided within neck member 16, is adapted to receive the unattached end 20 of tether 14 and lock it securely in place.

Preferably, the locking mechanism for tether 14 is provided by a plurality of resilient stopping members 22 which are interspaced upon tether 14. Preferably, the stopping members 22 are generally conical or pyramidal in shape, with the vertex 24 of the cone or pyramid along the centerline of thether 14 and the base 26 of the cone or pyramid extending back toward the attached end of tether 14. Stopping members 22 are formed from the same resilient material which is used to form suction cup 12 and are sized so that the stopping members 22 will enter bore 18 when the vertex 24 leads but will be blocked from leaving bore 18 when the base 26 leads. Preferably, stopping members 22 are provided with a hollow inner portion 28. This inner portion 28 permits base 26 of stopping member 22 to be squeezed into a diameter less than that of bore 18. This will ease the insertion and removal of tether 14 from bore 18.

Because tether 14 is integrally attached to suction cup 12, there is no possibility of misplacing or losing the fastening device. This attachment also permits the suction cup 12 and tether 14 to be formed from injection molded plastic during the same operation. This reduces the manufacturing costs for the suction cup and fastening device 10 and speeds up production.

Figure 5:
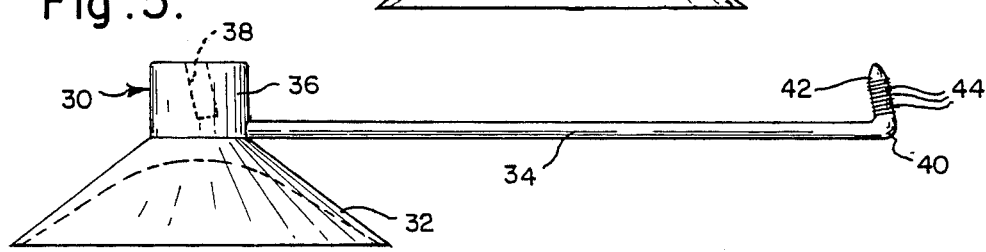
FIG. 5 is a side elevational view of the suction cup and fastener of FIG. 4.
Figure 4:
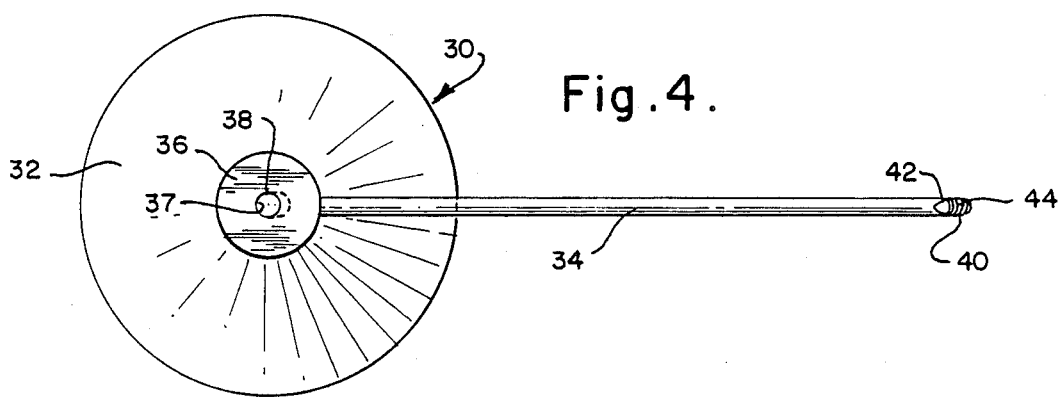
FIG. 4 is a top plan view of a second present preferred embodiment of the suction cup and fastener of my invention.
Figure 6:
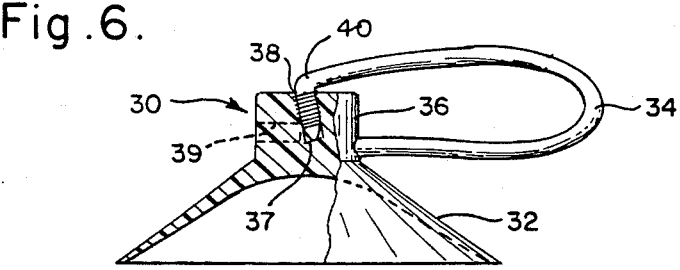
FIG. 6 is a side cross-sectional view of the suction cup and fastener of FIG. 4 taken along the line VI—VI of FIG. 4 showing the method of attachment.

An alternative attachment means is shown in FIGS. 4 through 6. Suction cup and fastener 30 is composed of suction cup 32 having a neck member 36 and a tether 34 integrally attached thereto. Tether 34 is sized to pass through hooks or other fasteners on ornaments or other objects. A bore 38, which is provided within neck member 36, is adapted to receive the unattached end 40 of tether 34 and lock it securely in place.

In this embodiment, the locking mechanism for tether 34 is provided by cylindrical rod member 42 on which a plurality of ribs 44 are circumferentially interspaced. Ribs 44 are preferably no more than 0.004 inches in height and 0.008 inches apart. Bore 38 may be provided with a corresponding ribbed surface 37 on its interior which interacts with the ribs 44 of tether 34 to secure tether 34 to the neck member 36.

For additional securing strenght, bore 38 is positioned at a 10° angle with respect to the longitudinal axis of neck member 36. Rod member 42 is also aligned at the same 10° angle. When the suction cup 32 is attached to a vertical surface, the angle of bore 38 should be aligned in a downward direction. This downward angle of bore 38 provides added strength to the ribbed connection.

Additional securing strength can also be obtained by hardening rod member 42. Possible methods of hardening rod member 42 include heating rod member 42 after it has been formed in the mold and tempering the rod member 42 by either heating or chilling. Once hardened, rod member 42 can be inserted into bore 38 with much more ease.

Suction cup and fastening device 30 permits one to interchange the ornaments which are hung. Because the tether 34 is secured within bore 38, but not locked thereby, tether 34 can be removed from bore 38 whenever a different ornament is to be hung. This ability to interchange ornaments makes suction cup and fastening device 30 highly attractive.

Because suction cup and fastening device 30 is an integral piece, it can be manufactured in a single injection molding operation. Because the ribs on rod member 42 and bore 38 are of limited height and close proximity, they will not strip when removed from a mold in which they are fully formed. Furthermore, the ribs will not strip will rod member 42 is removed from bore 38.

FIG. 6 shows an alternate bore 39 provided in neck member 36. This bore 39 extends partly along a radius of said neck member 36. When suction cup and fastening device 30 having bore 39 is used, suction cup and fastening device 30 should be aligned on a vertical surface such that bore 39 is at or near the uppermost position. This alignment provides the most secure connection between rivet 42 and bore 39.

Figure 7:
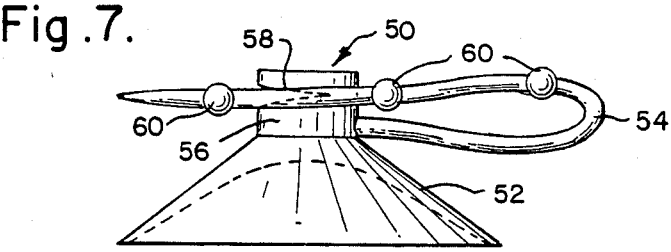
FIG. 7 is a side elevational view of a third present preferred embodiment of the suction cup and fastener of my invention.

A third attachment means is shown in FIG. 7. Suction cup and fastener 50 is provided with a tether 54. Tether 54 is provided with generally spherical protuberances 60. A notched member, such as V-shaped projection 58 extends from neck member 56 and is adapted to receive tether 54. Spherical protuberances 60 become entrapped in projection 58 thereby locking tether 54 in a looped arrangement.

Figure 8:
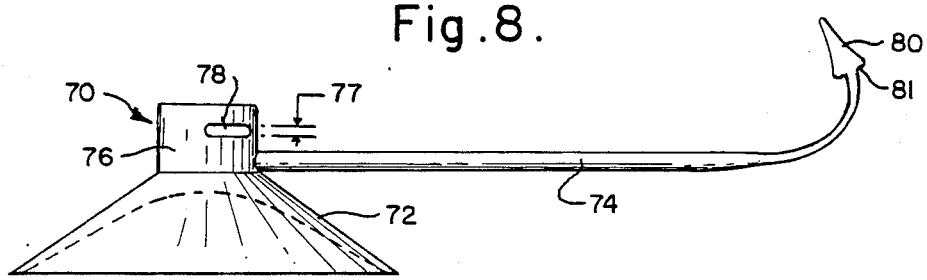
FIG. 8 is a side elevational view of a fourth present preferred embodiment of the suction cup and fastener of my invention.

A fourth attachment means is shown in FIG. 8. Suction cup and fastener 70 is provided with a tether 74. Tether 74 is provided at its terminus with a generally arrowhead-shaped stopping member 80 having a relatively narrow width. A notch 78 in the shape of a narrow channel projects through a side of neck member 76. The notch 78 is positioned such that its length extends in the same direction as tether 74 extends from neck member 76 and its width 77 extends away from suction cup 72. The width 77 of notch 78 is greater than the width of stopping member 80 but less than the length of the base 81 of stopping member 80.

Notch 78 is adapted to receive tether 74 only when tether 74 is twisted to align stopping member 80 in a lengthwise orientation with notch 78. Once it is passed through notch 78, tether 74 will return to its normal position and stopping member 80 will prevent tether 74 from passing back through notch 78. In this manner, stopping member 80 and notch 78 coact to lock tether 74 in a looped arrangement with suction cup and fastener 70.

Figure 9:
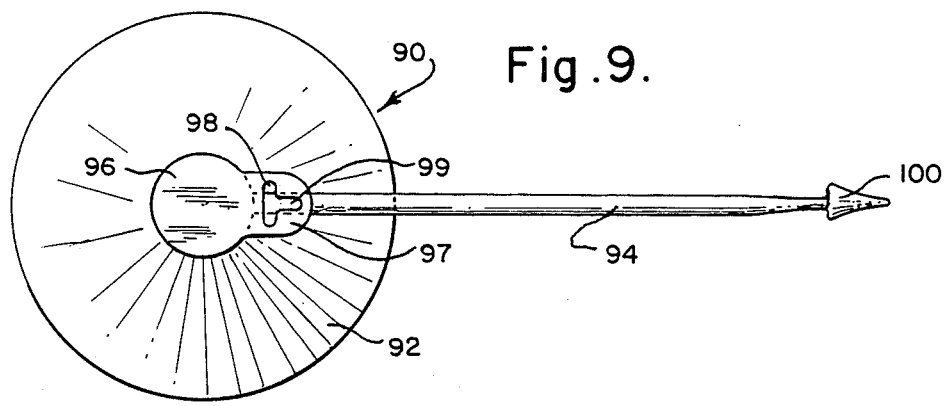
FIG. 9 is a top plan view of a fifth present preferred embodiment of the suction cup and fastener of my invention.

Another embodiment of my attachment means is shown in FIG. 9. Suction cup and fastener 90 is provided with a tether 94. Tether 94 is provided at its terminus with a generally conical stopping member 100. A notch 98 in the shape of a keyhole is provided in a projection 97 which extends from neck member 96. Stopping member 100 is adapted to fit into wide mouth notch 98 and lock into slot 99 therein, thereby securing tether 94 in a looped arrangement with suction cup and fastener 90.

While I have shown and described a present preferred embodiment of the invention, it is to be distinctly understood that the invention is not limited thereto but may be otherwise variously embodied and practiced within the scope of the following claims.

I claim:

1. A suction cup and integral fastener comprising:
   (a) a suction cup having a cup portion and a neck member extending therefrom;
   (b) a flexible tether portion extending outwardly from said suction cup;
   (c) locking means provided on the tether, said locking means being sized and positioned for engagement of a receiving means; and
   (d) receiving means provided on said suction cup adapted to receive and secure said locking means of said tether so that when secured said tether will form a loop.

2. The suction cup and fastener of claim 1 wherein said tether is connected to said neck member portion of said suction cup.

3. The suction cup and fastener of claim 1 wherein said locking means comprises a plurality of resilient stopping members interspaced along said tether.

4. The suction cup and fastener of claim 3 wherein said receiving means is formed by an opening in the neck member, said opening adapted to receive said tether and secure said tether in a locked position.

5. The suction cup and fastener of claim 4 wherein said resilient stopping members on said tether are generally conical in shape and aligned such that said stopping members permit movement of said tether through said opening in only one direction.

6. The suction cup and fastener of claim 4 wherein said resilient stopping members on said tether are generally pyramidal in shape and aligned such that said stopping members permit movement of said tether through said opening in only one direction.

7. The suction cup and fastener of claim 2 wherein said receiving means is formed by having a notched projection attached to said neck member and said locking means comprises a plurality of protuberances interspaced along said tether, said projection adapted to receive said tether and secure said tether in a locked position.

8. The suction cup and fastener of claim 7 wherein said protuberances on said tether are generally spherical in shape.

9. The suction cup and fastener of claim 1 wherein said locking means comprises a rivet attached to said other end of said tether, said rivet having a plurality of ribs interspaced thereon.

10. The suction cup and fastener of claim 9 wherein said receiving means is formed by a bore provided through said neck member, said bore adapted to receive said ribbed rivet.

11. The suction cup and fastener of claim 10 wherein said bore is provdied with ribs which may interact with said ribs of said ribbed rivet to secure said tether in a locked position.

12. The suction cup and fastener of claim 11 wherein said bore is provided at an angle within said neck member so that when said suction cup is hung on a vertical surface said bore angles downward.

13. The suction cup and fastener of claim 12 wherein said angle of said bore is in the range of 5° to 20° from vertical.

14. The suction cup and fastener of claim 1 wherein said locking means comprises a stopping member attached to said other end of said tether.

15. The suction cup and fastener of claim 14 wherein said receiving means is formed by an opening in said neck member, said opening adapted to receive said stopping member and secure said tether in a locked position.

16. The suction cup and fastener of claim 15 wherein said stopping member is generally arrowhead-shaped and said opening is a notch having an elongated channel.

17. The suction cup and fastener of claim 15 wherein said stopping member is generally conical and said opening is a keyhole shaped notch.

* * * * *